April 15, 1952      H. KATZ      2,592,908

QUICK OPERATING FLOAT VALVE

Filed July 8, 1946      2 SHEETS—SHEET 1

INVENTOR.
HARRY KATZ
BY Robert M. Dunning

April 15, 1952  H. KATZ  2,592,908
QUICK-OPERATING FLOAT VALVE
Filed July 8, 1946  2 SHEETS—SHEET 2
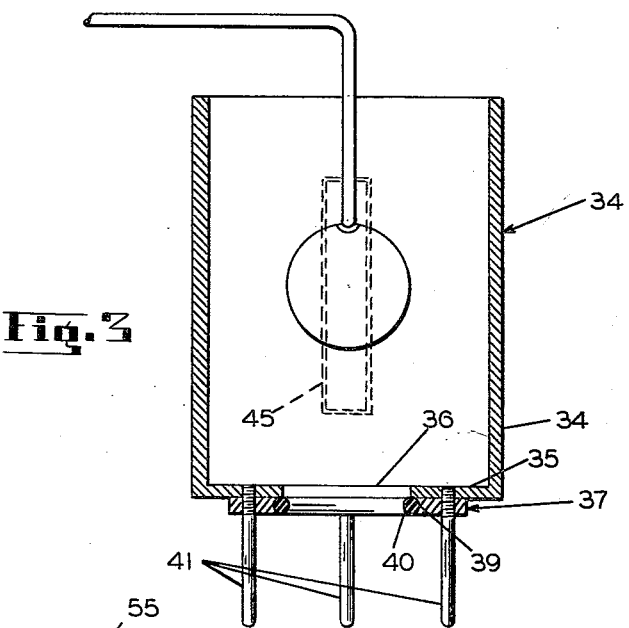
Fig. 3
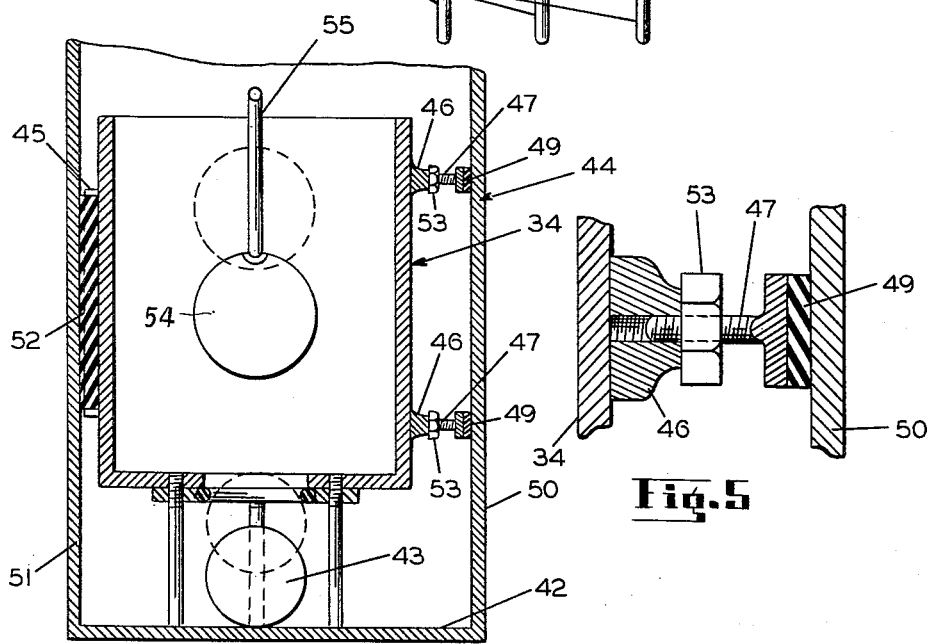
Fig. 4
Fig. 5
INVENTOR.
HARRY KATZ
BY 

Patented Apr. 15, 1952

2,592,908

UNITED STATES PATENT OFFICE 2,592,908

QUICK-OPERATING FLOAT VALVE

Harry Katz, St. Paul, Minn.

Application July 8, 1946, Serial No. 681,875

2 Claims. (Cl. 137—104)

1

My invention relates to an improvement in quick operating float valves wherein it is desired to provide a means of opening or closing a float valve in a minimum of time.

Many float valves designed for operation by a float close gradually as the float approaches valve closing position. As a result when such a valve is used to control the flow of liquid to a toilet tank or the like, the flow of fluid is gradually decreased, requiring excessive time to fill the tank and usually creating an undesirable noise.

It is the object of the present invention to produce a means of closing the water supply valve relatively quickly. As a result the tank is able to fill more quickly and much of the objectionable noise of the water flowing through the partially closed valve is eliminated.

A feature of the present invention resides in the provision of an auxiliary tank within a larger tank. When the larger tank is emptied the auxiliary tank also empties. However, the auxiliary tank remains empty until the main tank is full. Overflow from the main tank then quickly fills the auxiliary tank, thus closing the float valve in a relatively short period of time.

A feature of the present invention resides in the provision of a relatively small volume chamber in conjunction with a relatively large volume chamber and the mounting of a float within the small chamber. The level of liquid in the large chamber rises slowly as the large tank fills. The liquid level in the relatively small tank rises quickly, thereby filling the small tank in a short period of time. Thus the float is quickly elevated when liquid enters the relatively small chamber.

A feature of the present invention resides in the provision within a large tank of a relatively small tank for containing a valve float and having at its lower extremity a check valve. This check valve permits the emptying of the small tank together with the large tank, but prevents liquid from entering through the bottom of the small tank, thereby maintaining the relatively small chamber empty of liquid until the larger tank is filled.

These and other objects and novel features of my invention will be more clearly and fully set forth in the following specification and claims.

In the drawings forming a part of my specification:

2

Figure 1:
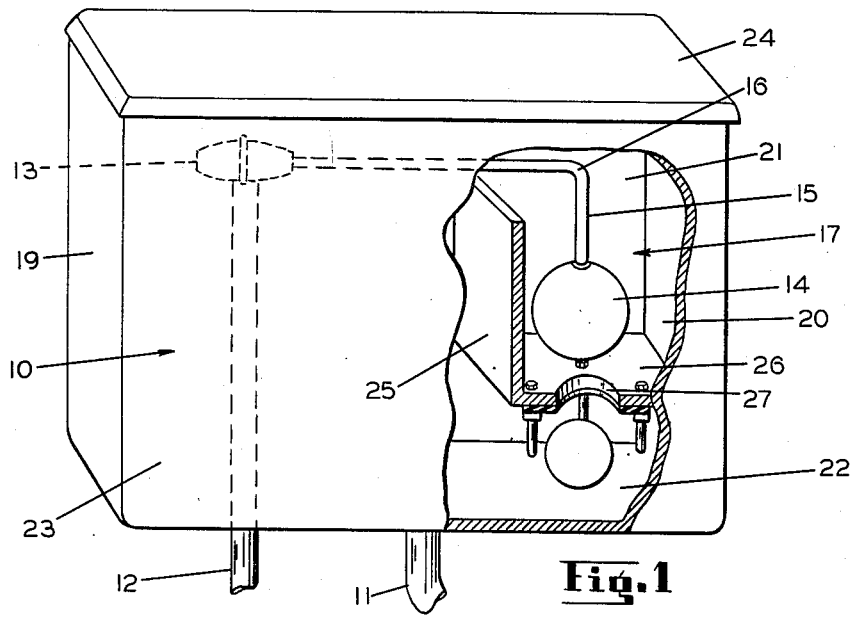
Figure 1 is a perspective view of a toilet flush tank showing my auxiliary compartment incorporated therein.

Figure 3 is a vertical section through a modified form of tank construction.

Figure 4 is a cross sectional view through the toilet flush tank showing the tank of Figure 3 incorporated therein.

Figure 5 is a detail sectional view showing the manner in which the auxiliary tank is anchored in place.

The tank 10 may be of any suitable type and in the form illustrated comprises a tank for holding water to be emptied into a toilet or the like. The valve mechanism for emptying the water from the tank 10 into the toilet may be any conventional type of apparatus and is not illustrated in the drawings. The liquid may leave the tank 10 through the outlet pipe 11 and may enter the toilet through the inlet pipe illustrated generally by the numeral 12. The valve 13 is provided in the inlet pipe 12 to fill the tank 10 once this tank has been opened. The valve 13 is actuated by a float 14 connected to the valve by a float arm or rod 15.

In the conventional type of apparatus the float 14 usually is positioned to lie on the top of the water within the tank 10 and to close the valve 13 when the water in the tank 10 reaches a predetermined elevation. In the present apparatus the supporting float rod 15 is bent downwardly as indicated at 16 so that the float 14 is positioned within the auxiliary tank illustrated in general by the numeral 17.

The tank 17 is provided within the main tank 10 and forms a relatively small part thereof. The tank 10 includes spaced end walls 19 and 20, a rear wall 21, a bottom wall 22, and a front wall 23. The top of the tank is closed with a suitable top closure 24. The tank 17 may be formed by means of a partition wall 25 extending from the rear wall 21 to the front wall 23 and substantially parallel to the end walls 19 and 20. A bottom wall 26 is provided at the lower end of the partition wall 25 to form the bottom of the auxiliary tank 17. The top of the partition wall 25 terminates below the upper extremities of the side and end walls of the tank 10. The auxiliary tank 17 is of proper dimensions to receive the float 14 therein.

An aperture 27 is provided in the bottom wall 26 of the tank 17. A ring 29 is supported beneath the bottom wall 26 concentric with the aperture 27. A gasket 30 is clamped between the ring 29 and the undersurface of the bottom wall 26 in in the area thereof encircling the aperture 27. The gasket 30 is preferably formed of resilient material and acts as the seat of a check valve formed by the float ball 31.

The float ball 31 is held beneath the aperture 27 by any suitable means such as the downwardly extending fingers 32. These fingers 32 have the upper end thereof reduced in diameter so as to form shoulders engaging the undersurface of the ring 29. The reduced diameter upper end portions of the fingers 32 extend through angularly spaced apertures in the ring 30, and through corresponding apertures in the gasket 39 and the bottom wall 26 of the tank 17. Nuts 33 are provided on the upper ends of the fingers 32, thus acting to clamp the gasket 30 in place and also to provide a cage for movably containing the float ball 31.

The operation of my apparatus is as follows: If the tank 10 is empty the tank 17 is likewise empty. Accordingly the float 14 is exerting a downward pull upon the float arm 15 acting to open the valve 13. Water enters the tank 10 through the inlet pipe 12 and through the valve 13 raising the liquid level in the tank 10. As the liquid level raises in the tank 10 the float ball 31 rises until this float ball closes the aperture 27 by its engagement against the gasket 30. The liquid then continues to rise within the tank 10 but the lower end of the tank 17 is sealed and as a result the tank 17 remains empty.

The liquid continues to rise in the tank 10 until this tank is substantially full. At this time liquid overflows over the top of the partition wall 25 into the tank 17. Because of the relatively small size of the tank 17 the liquid level rises quickly in the tank 17, thus quickly shutting off the valve 13. As a result the time during which the valve 13 is partially closed is extremely short, thus preventing much of the noise often caused by the water flowing through the partially closed valve.

In the operation of the tank the water may be drained therefrom through the tank outlet 11, thus quickly lowering the level of liquid in the tank 10. As soon as the liquid level in the tank 10 becomes equal to or slightly lower than the liquid level in the tank 17 the float 31 will be disengaged from its seat permitting the liquid to flow from the tank 17. Thus as the liquid is drained from the tank 10, it is also drained from the tank 17.

Figure 2:
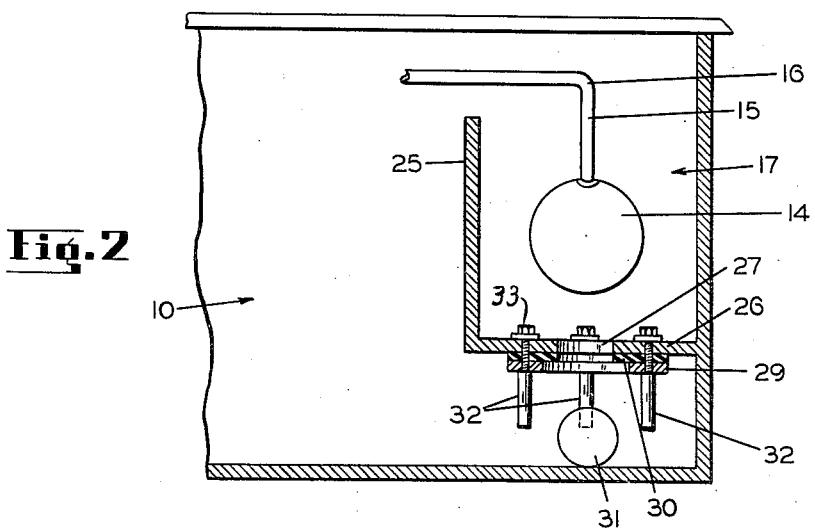
Figure 2 is a cross sectional view through a portion of the tank shown in Figure 1.

In Figures 3, 4, and 5 of the drawings I disclose a similar structure which may be used in toilet flush tanks previously in use. The construction shown in Figures 1 and 2 is particularly adapted for new tanks being manufactured. In the construction shown in Figures 3, 4, and 5 of the drawings I provide a tank 34 which may be substantially cylindrical in cross section having an open top and a closed bottom 35. An aperture 36 is provided in the bottom 35. A ring 37 may be brazed or otherwise sealed to the tank bottom 35 concentric with the aperture 36. The ring 37 is preferably provided with a concave inner surface 39 to accommodate a ring shaped gasket 40. This ring shaped gasket 40 is designed to act as a seat for the float valve which will be later described.

A series of legs 41 are supported by the rings 37 to extend downwardly therefrom. These legs 41 are designed to support the tank upon the bottom 42 of the toilet flush tank and also act as a guide for a float ball 43 best illustrated in Figure 4 of the drawings.

In view of the fact that the tank 34 may be partially empty when the surrounding tank 44 is relatively full, means must be provided for holding the tank 34 in place to prevent this tank from flooding. A vertical channel 45 is preferably secured to one side of the tank 34 while a pair of vertically spaced bosses 46 project from the other side thereof. Bolts 47 are threadably engaged in the bosses 46 and the heads of these bolts are equipped with rubber bumpers 49 to engage against one wall 50 of the flush tank 44. The other wall 51 of the flush tank is engaged by a rubber strip 52 mounted in the vertical channel 45. Thus it will be seen that in fastening the tank 34 in place the tank is placed with the rubber strip 52 against one wall 51 of the flush tank and the bolts 47 are then threaded outwardly until the bumpers 49 mounted thereupon engage the opposite wall 50. Lock nuts 53 are provided on the bolts 47 to hold the bolts 47 in adjusted position.

The operation of this construction is similar to that previously described. The float 54 is supported by a float rod 55 connected to a valve similar to the valve 13. When liquid is introduced into the tank 44 through the intake pipe thereof it raises the float ball 43 until this float engages the ring like seat 40. This closes the lower end of the auxiliary tank 34. Liquid continues to rise about the auxiliary tank 34 until the level is sufficiently high to overflow into this tank. Upon the overflow of liquid into the tank the liquid level rises quickly, thus quickly acting to elevate the float ball 54 and to close the inlet valve 13.

I have found that by reducing the time required to close the inlet valve 13, much of the objectionable noise often made by the liquid entering the flush tank may be eliminated. Furthermore the operation of filling the tank is considerably increased because the float valve is not gradually closed as the liquid level rises in the main tank.

In accordance with the patent statutes, I have described the principles of construction and operation of my quick operating float valves and while I have endeavored to set forth the best embodiments thereof, I desire to have it understood that obvious changes may be made within the scope of the following claims without departing from the spirit of my invention.

I claim:

1. In a flush box having a water inlet and outlet pipe, in connection therewith and a valve in the inlet pipe, control means for the inlet valve comprising an arm having a float suspended therefrom near its outer end and a receptacle into which the float projects, said receptacle having a base provided with an opening communicating the interior of the receptacle and the tank, a check valve in the opening permitting liquid to flow from the receptacle into the tank, and means for frictionally securing the receptacle to the tank comprising wall engaging lugs projecting in opposite directions, and means for urging the projections against the opposite surfaces of the tank wall to secure the receptacle in position therein.

2. A quick acting float valve apparatus comprising a main tank, an auxiliary tank within said main tank, an inlet adjacent the top of said auxiliary tank through which water may flow from the main tank, an opening in the bottom of said auxiliary tank forming an outlet therefor through which water may flow into the main tank, a series of spaced downwardly extending projections on the bottom of said auxiliary tank spaced about said opening, said downward projections comprising legs supporting said auxiliary tank on the bottom of said main tank, a float ball below the opening in said auxiliary tank and confined by said spaced projections, said float ball being of larger diameter than the opening in said auxiliary tank and acting to close said opening in raised position of said float ball, a fluid inlet to said main tank, a valve controlling the flow of fluid through said fluid inlet, and a float in said auxiliary tank connected to said valve to actuate the same.

HARRY KATZ.

REFERENCES CITED

The following references are of record in the file of this patent:

UNITED STATES PATENTS

| Number | Name | Date |
|---|---|---|
| 1,037,679 | Snyder | Sept. 3, 1912 |
| 1,084,267 | Gleeson | Jan. 13, 1914 |
| 1,237,276 | Ball | Aug. 21, 1917 |
| 1,590,321 | Sartakoff | June 29, 1926 |
| 1,943,569 | Warner | Jan. 16, 1934 |
| 2,040,272 | Ricard | May 12, 1936 |

FOREIGN PATENTS

| Number | Country | Date |
|---|---|---|
| 611,270 | Germany | of 1935 |
| 717,122 | France | of 1931 |